United States Patent
Vogel et al.

(10) Patent No.: US 9,194,698 B2
(45) Date of Patent: Nov. 24, 2015

(54) GEODETIC DEVICE AND A METHOD FOR DETERMINING A CHARACTERISTIC OF THE DEVICE

(71) Applicant: TRIMBLE Jena GmbH, Jena (DE)

(72) Inventors: Michael Vogel, Schleifreisen (DE); Andreas Glimm, Weimar (DE)

(73) Assignee: Trimble Jena GmbH, Jena (DE)

( * ) Notice: Subject to any disclaimer, the term of this patent is extended or adjusted under 35 U.S.C. 154(b) by 125 days.

(21) Appl. No.: 14/160,442

(22) Filed: Jan. 21, 2014

(65) Prior Publication Data

US 2014/0202012 A1  Jul. 24, 2014

(30) Foreign Application Priority Data

Jan. 23, 2013 (DE) .................. 10 2013 001 136

(51) Int. Cl.
*G01B 11/27* (2006.01)
*G01C 15/00* (2006.01)
*G01C 25/00* (2006.01)

(52) U.S. Cl.
CPC .............. *G01B 11/27* (2013.01); *G01C 15/00* (2013.01); *G01C 25/00* (2013.01)

(58) Field of Classification Search
CPC ...... G01C 1/02; G01C 2009/066; G01C 9/06; G01C 9/20; G01C 15/002; G01C 15/00; G01C 25/00; G01C 15/006; G01C 3/06; G01C 11/27; G01C 11/026; G01C 11/06; G01C 11/14; G01C 11/26
USPC ..................................... 33/228, 290, DIG. 21
See application file for complete search history.

(56) References Cited

U.S. PATENT DOCUMENTS

| | | | |
|---|---|---|---|
| 6,138,367 A | 10/2000 | Raby | |
| 2006/0021236 A1* | 2/2006 | Endo | 33/290 |
| 2006/0191148 A1* | 8/2006 | Lippuner | 33/290 |
| 2006/0242850 A1* | 11/2006 | Ammann et al. | 33/290 |
| 2007/0104353 A1 | 5/2007 | Vogel | |
| 2010/0064534 A1* | 3/2010 | Schumacher et al. | 33/228 |
| 2012/0186088 A1* | 7/2012 | Amor | 33/228 |
| 2014/0202012 A1* | 7/2014 | Vogel et al. | 33/228 |
| 2014/0247439 A1* | 9/2014 | Neier et al. | 356/4.01 |
| 2015/0029489 A1* | 1/2015 | Metzler et al. | 356/4.01 |
| 2015/0042977 A1* | 2/2015 | Siercks et al. | 356/4.01 |
| 2015/0185327 A1* | 7/2015 | Boeckem et al. | G01C 1/02 |

FOREIGN PATENT DOCUMENTS

DE  10 2010 004 517 A1  7/2010
WO  2004/113835 A1  12/2004

* cited by examiner

*Primary Examiner* — Yaritza Guadalupe-McCall
(74) *Attorney, Agent, or Firm* — Kilpatrick Townsend & Stockton LLP

(57) ABSTRACT

A geodetic device comprises three device components, two axes of rotation, and two angle sensors such that the device components are rotatable with respect to each other and their rotational positions are determinable, and an inclination sensor system. A method for determining a characteristic of the device comprises an alignment of the second device component with respect to the first device component into a plurality of different rotational positions, whereby in each rotational position of the plurality of rotational positions a measurement value is determined from the first angle sensor, a measurement value is determined from the second angle sensor, and a measurement value is determined for the orientation of the inclination sensor system.

18 Claims, 3 Drawing Sheets

GEODETIC DEVICE AND A METHOD FOR DETERMINING A CHARACTERISTIC OF THE DEVICE

CROSS-REFERENCE TO RELATED APPLICATION

The present non-provisional application claims benefit of German Patent Application DE 10 2013 001 136.1, filed on Jan. 23, 2013, and entitled "GEODÄTISCHES GERÄT UND VERFAHREN ZUM BESTIMMEN EINER EIGENSCHAFT DES GERÄTS", the disclosure of which is incorporated herein by reference in its entirety for all purposes.

FIELD OF THE INVENTION

The invention relates to a device and in particular to a surveying instrument like a geodetic device, and a method for determining a characteristic of a respective device.

BACKGROUND TO THE INVENTION

Geodetic devices typically have a base forming a first device component that may for instance be mounted onto a tripod. The first device component supports a second device component being rotatable relative to the first device component about a first axis of rotation. The base is usually oriented, for example by adjusting the tripod, such that the first axis of rotation is aligned vertically in space, i.e. parallel to the direction of gravitation. The second device component supports a third device component comprising for instance optics having a measurement axis and being rotatable relative to the second device component about a second axis of rotation. This measurement axis may form a line of sight of the geodetic device along which measurements using the optics can be performed, like for instance angular measurements or distance measurements. The first and the second axis of rotation are basically aligned orthogonally with each other. A first angle sensor is provided to determine a rotational position of the second device component with respect to the first device component, and a second angle sensor is provided to determine a rotational position of the third device component with respect to the second device component. In order to associate a measurement performed for instance with the optics along the measurement axis with a spatial direction, the alignment of the measurement axis of the third device component can be determined with respect to the base of the device from the measurement values obtained from the first angle sensor and the second angle sensor.

Since a user will, when adjusting e.g. the tripod for the first device component manually, only be able to approximately align the first axis of rotation in parallel with the gravitational direction, a high-precision inclination sensor is usually mounted on the first device component or the second device component for enabling a precise determination of the alignment of the first axis of rotation with respect to the gravitational direction. A measurement value obtained from the inclination sensor is then included in the calculation of the alignment of the optics' measurement axis based on the measurement values obtained from the first and second angle sensors.

The measurement range of high precision inclination sensors is, however, limited to, for example, less than 1°. This limited measurement range forms a portion of the possible orientations of the inclination sensor in which the sensor is enabled to determine its orientation relative to the gravitational direction with a specified preciseness. A user is then required to align the base and thus the inclination sensor with such a precision that the inclination sensor is disposed within its measurement range. This is time-consuming and limits the possible alignments of the base of the geodetic device. Further, even the measurement signals output from high-precision inclination sensors are possibly not exactly proportional to the actual alignment of the inclination sensor with respect to the gravitational direction and therefore error-prone.

In addition, it is assumed, when determining the spatial alignment of the measurement axis like the optics' measurement axis based on the measurement values obtained from the first and second angle sensors as well as from the inclination sensor, that the angle between the first axis of rotation and the second axis of rotation is exactly 90°. Due to the device's assembling tolerances and due to deformations caused by the proper weight of the device components this is in practice only approximately true.

It is therefore an object of the present invention, to provide a device and a method for operating the device, the device enabling a determination of device parameters comprising in particular at least one of the alignment of the first device component with respect to the gravitational direction, the alignment of the first axis of rotation with respect to the second axis of rotation, and a characteristic of the inclination sensor.

SUMMARY OF THE INVENTION

According to embodiments of the invention, a surveying instrument like a geodetic device, comprises a first device component, a second device component rotatable with respect to the first device component about a first axis of rotation, a third device component rotatable with respect to the second device component about a second axis of rotation aligned transversely to the first axis of rotation, the third device component including optics having a measurement axis, a first angle sensor to determine a rotational position of the second device component with respect to the first device component, a second angle sensor to determine a rotational position of the third device component with respect to the second device component, an inclination sensor system adapted to determine a first orientation of the inclination sensor about a first sensor axis with respect to the gravitational direction, the inclination sensor system being mounted on the third device component such that the first sensor axis is not aligned orthogonally to the second axis of rotation, and a controller adapted to determine from the measurement values obtained from the inclination sensor system at least one of an alignment of the first device component and the first axis of rotation, respectively, relative to the gravitational direction, and an alignment of the first axis of rotation with respect to the second axis of rotation.

The inclination sensor system that is attached to the third device component enables a determination of a specific device characteristic, i.e. the alignment of the first device component with respect to the gravitational direction or the alignment of the first axis of rotation relative to the second axis of rotation. For this purpose, the controller reads measurement values from the inclination sensor system and determines the device characteristic based on these measurement values.

In the context of this application, two directions are regarded as being oriented transverse to each other, when not in parallel and in particular when the angle between the two directions is considerably greater than 0° within the limits of the measuring accuracy.

For this purpose, measurement values are used that have been obtained from the inclination sensor system in at least one of different rotational positions of the second device component relative to the first device component, and different rotational positions of the third device component relative to the second device component.

According to exemplary embodiments, the method for determining the characteristic of the device comprises an alignment of the second device component with respect to the first device component in a plurality of different rotational positions, whereby a measurement value is obtained from the first angle sensor, the second angle sensor, and the first orientation of the inclination sensor for each rotational position of the plurality of rotational positions, and a determination of the device characteristic based on the measurement values obtained in the different rotational positions from the first angle sensor, the second angle sensor, and the first orientation of the inclination sensor system.

The method enables a determination of the orientation of the first device component with respect to the gravitational direction without any need for a separate inclination sensor mounted on the first or second device component, and without requiring a user to align the first device component with respect to the gravitational direction such that the separate inclination sensor is within its measurement range. Thus it is even possible to attach the first device component to a tripod or to other objects such that there is a significant discrepancy between the direction of the first axis of rotation and the gravitational direction. The measurement range is thus extended.

According to exemplary embodiments, the inclination sensor system is a high-precision inclination sensor system having a measurement accuracy of better than 5", and in particular better than 2". The alignment of the first device component or first axis of rotation with respect to the gravitational direction may then be determined with a correspondingly high precision.

According to an exemplary embodiment, the first sensor axis is in parallel with the second axis of rotation.

According to further exemplary embodiments, the device comprises a first motor for rotating the second device component with respect to the first device component about the first axis of rotation, the first motor being operated by the controller for moving the second device component with respect to the first device component successively into the plurality of rotational positions.

According to exemplary embodiments, the controller determines in each rotational position of the plurality of rotational positions a first angle value based on the measurement value obtained from the second angle sensor and a second angle value based on the measurement value obtained from the first orientation of the inclination sensor system. According to a specific one of these embodiments, a third angle value may be determined for each rotational position of the plurality of rotational positions based on the measurement value obtained from the first angle sensor, and a pair of values may respectively be formed for each of the plurality of rotational positions, with the first value of the pair of values being the third angle value and the second value of the pair of values being the first angle value. Subsequently, a function may be fitted to the pair of values thus obtained that approximately fits the pair of values. The parameters of the function are hereby determined to minimize the displacements of the pairs of values from the function. One example of a respective minimization is the conventional least square minimization of the displacements of the first values of each pair of values from the function values, when the second value of the pair of values respectively forms the argument of the function. Based on the thus determined function parameters, the alignment of the first device component or first axis of rotation may be determined relative to the gravitational direction.

According to specific embodiments, when applying this method, it is useful to align the third device component with respect to the second device component in each rotational position of the plurality of rotational positions such that the second angle value is exactly zero. This can, for example, be effected by the controller driving a second motor adapted to rotate the third device component with respect to the second device component.

According to a further embodiment of the method, if the third device component is adjusted with respect to the second device component such that the second angle value shall not be zero for all of the rotational positions, a third angle value is determined for each rotational position of the plurality of rotational positions based on the measurement value from the first angle sensor, a fourth angle value is determined based on an addition of the first angle value and the second angle value, and a pair of values is provided for each rotational position of the plurality of rotational positions with the third angle value being the pair's first value and the fourth angle value being the pair's second value. A function may then be fitted to the thus obtained pairs of values as explained above. The alignment of the first device component with respect to the gravitational direction may again be determined from the function parameters obtained in the fitting procedure.

According to exemplary embodiments, the measurement range of the inclination sensor system with respect to the first orientation is limited and adapted to measure the first orientation only for a portion of the possible first orientations of the inclination sensor system about the first sensor axis relative to the gravitational direction with a given high-precision measurement accuracy. In this case, the third device component may, when the inclination sensor system is oriented in one of the rotational positions of the plurality of rotational positions such that it is outside its measurement range, be oriented with respect to the second device component such that the first orientation of the inclination sensor system is within the portion of the possible first orientations. This can be effected by having the controller drive a second motor that rotates the third device component with respect to the second device component.

According to exemplary embodiments, the function fitted to the pairs of values as explained above may be a sine function, and the parameters used to determine the alignment of the first device component or the first axis of rotation with respect to the gravitational direction comprise an amplitude and a phase of the sine function fitted.

According to exemplary embodiments, the device comprises an inclination sensor system being further adapted to determine a second orientation of the inclination sensor system about a second sensor axis relative to a gravitational direction, with the second sensor axis being aligned transversely, and in particular orthogonally, with respect to the first sensor axis. It is possible to precisely determine the alignment of the first axis of rotation with respect to the second axis of rotation using the measurement values for the second orientation of the inclination sensor system in combination with the other measurement values, for instance the measurement values for the first orientation of the inclination sensor system, the measurement values from the first angle sensor and/or the measurement values from the second angle sensor. This enables a more precise determination of the spatial alignment of the optics' measurement axis, and in particular then, when the angle between the first axis of rotation and the second axis of rotation differs from its mounting angle as assumed, like for instance 90°, due to at least one of tolerances in assembling and deformation of the device components.

Due to the tolerances in assembling and due to the weight-related deformation of the device components relative to each other, the angle between the first and the second axis of rotation is for example only known with an accuracy of better than 1' (1 arc minute), but can be determined with an accuracy of better than 1" (1 arc seconds) when using the method explained here.

According to exemplary embodiments of the method, a measurement value for the second orientation of the inclination sensor system is determined in two or more rotational positions of the plurality of rotational positions or in not all rotational positions of the plurality of rotational positions or in all rotational positions of the plurality of rotational positions of the second device component relative to the first device component to determine the alignment of the first axis of rotation with respect to the second axis of rotation therefrom.

According to further exemplary embodiments, a rotational position of the third device component with respect to the second device component is in a first rotational position of the plurality of rotational positions of the second device component with respect to the first device component hereby different to a rotational position of the third device component with respect to the second device component in a second rotational position of the plurality of rotational positions of the second device component with respect to the first device component. This means that for at least two different rotational positions of the second device component with respect to the first device component there are also two different rotational positions of the third device component with respect to the second device component for obtaining the measurement values.

According to further exemplary embodiments, the second device component is aligned about the first axis of rotation with respect to the first device component before an alignment of the third device component with respect to the second device component in the first rotational position such that the second axis of rotation is aligned substantially orthogonally to the gravitational direction, i.e. substantially horizontally. Hence it is possible to reduce a so-called mutual influence error when determining the characteristic of the inclination sensor system that could occur upon a determination of the first and the second measurement value for the first orientation of the inclination sensor system in the first or second rotational position.

BRIEF DESCRIPTION OF THE DRAWINGS

In the following, the invention is explained in more detail referring to figures whereby.

DETAILED DESCRIPTION OF THE INVENTION

Figure 1:
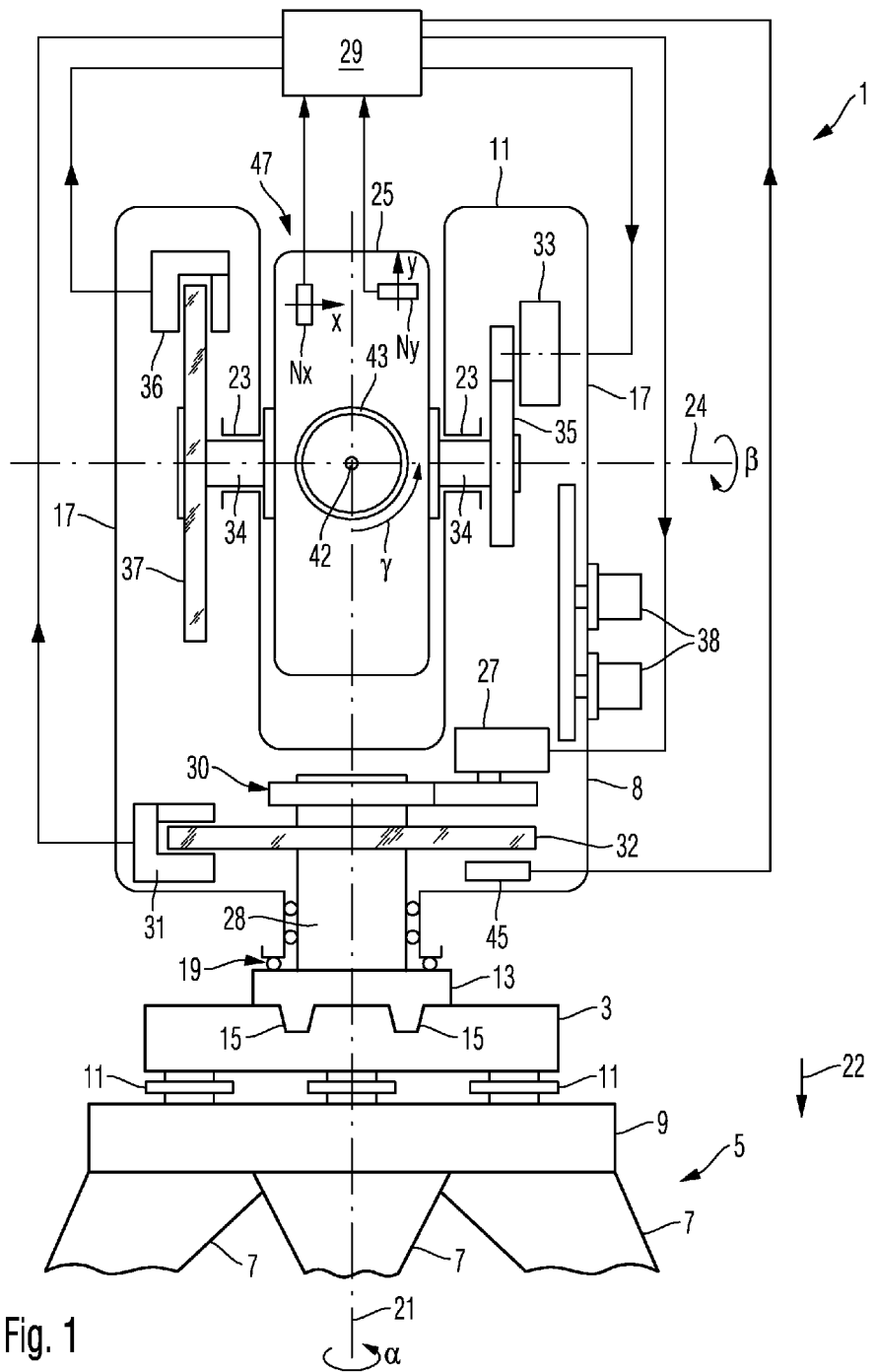
FIG. 1 shows a schematic view of a geodetic device.

FIG. 1 is a schematic representation of a geodetic device that may be for instance a theodolite, a tachymeter or a total station. The device 1 is mounted onto a tripod 5 comprising three legs 7 mounted to a head 9 and a plate 3 attached to the head 9 by three leveling screws 11. The device 1 comprises a base 13 fixed to the plate 3 by a fixing mechanism in a predetermined and reproducible position. The fixing mechanism may for instance comprise tapered protrusions 15 engaging into respective recesses provided in plate 3, and a retaining mechanism (not shown in FIG. 1).

Base 13 forms a first device component of the device 1 and supports a second device component 17 that is attached to the base 13 by an arrangement of bearings 19 such that the second device component 17 is rotatable relative to the first device component 13 about a first axis 21.

A user typically adjusts the leveling screws 11 such that the first axis 21 is substantially in parallel with the gravitational direction 22 resulting in the first axis 21 being a vertical axis.

The device 1 comprises a third device component 25 held with respect to the second device component 17 by axes 34 supported by pivot bearings 23 such that the third device component 25 is rotatable with respect to the second device component 17 about a second axis of rotation 24. The second axis of rotation 24 is aligned at an angle of about 90° with respect to the first axis of rotation 21, resulting in the axis of rotation 24 being a horizontal axis, when the first axis of rotation 21 is aligned vertically.

The third device component 25 comprises an optical measurement system having an objective lens 43 and a measurement axis 42 aligned, in the representation of FIG. 1, orthogonally to the plane of projection. The optical measurement system serves to make measurements, like for instance distance measurements or bearings along the measurement axis 42.

A motor 27 supported at the second device component 17 engages via a transmission 30 with a swivel pin 28 mounted to the first device component 13 such that a motor driven rotation of the second device component 17 with respect to the first device component 13 about the first axis of rotation 21 is enabled by control of motor 27. The motor 27 is controlled by a controller 29 of the geodetic device.

Attached to the swivel pin 28 is an angle encoder disk 32 and a corresponding angle sensor 31 is mounted to the second device component 17. Measurement values from the angle sensor 31 are read by the controller 29 to determine a rotation angle α of the second device component 17 relative to the first device component 13 about the first axis of rotation.

A motor 33 supported by the second device component 17 is engaged with one of the axes 34 via a transmission 35 such that the third device component 25 may be rotated about the axis 24 upon actuation of motor 33. The motor 33 is controlled by controller 29.

Attached to the axis 34 is an angle coding disk 37 and a corresponding angle sensor 36 is mounted to the second device component 17. Measurement values from the angle sensor 36 are read by the controller 29 to determine a rotation angle β of the third device component 25 relative to the second device component 17 about the second axis of rotation 24.

Control buttons 38 are provided on the second device component 17 for being activated by a user to prompt the controller 29 in order to drive the motors 27 and 33 for jointly pivoting the third device component and the optical measurement system about the first axis of rotation 21 and the second axis of rotation 24, respectively.

The controller 29 can determine the alignment of the optics' 43 measurement axis 42 with respect to the first device component 13 from the measurement values obtained from the angle sensors 31 and 36 at a given rotational position of the third device component 25 about the first and second axis of rotation 21, 24. However, knowledge of the spatial alignment of the first axis of rotation 21 is required to determine the spatial alignment of the optics' 43 measurement axis 42, since the first-mentioned is usually not aligned exactly in parallel with the gravitational direction. An inclination sensor 45 read out by the controller 29 may therefore be mounted to the first device component 13 or the second device component 17. With the orientation of the inclination sensor 45 relative to the first axis of rotation 21 known, the alignment of the first axis of rotation 21 with respect to the gravitational direction can thus be determined. A high-precision determination of said orientation requires a high-precision inclination sensor 45. The measurement range of such high-precision inclination sensors is, however, typically limited to less than 1°. In order to operate the device 1, a user is therefore required to precisely adjust the first axis of rotation 21 and thus the first device component 13 by operating the leveling screws 11, which is very time consuming. For this reason it is in particular not possible to operate the device 1 in any of the alignments of the first axis of rotation 21.

To avoid a user being required to align the first axis of rotation precisely in parallel with the gravitational direction and/or enabling an operation of the device 1 even with alignments of the axis of rotation 21 significantly deviating from the gravitational direction, the device 1 comprises an inclination sensor system 47 mounted to the third device component 17, the system being adapted to measure a first orientation Nx of the inclination sensor system 47 about a first sensor axis x with respect to the gravitational direction. In the illustrated embodiment, the first sensor axis x is aligned in parallel with the second axis of rotation 24. The inclination sensor system 47 is further adapted to measure a second orientation Ny of the inclination sensor system 47 about a second sensor axis y with respect to the gravitational direction. In the illustrated exemplary embodiment, the second sensor axis y is aligned orthogonally to the first sensor axis x. In the rotational position of the third device component 25 with respect to the second device component 17 as illustrated in FIG. 1, the second sensor axis y is aligned in parallel with the first axis of rotation 21. This will not be the case in other rotational positions of the third device component 25 with respect the second device component 17.

The inclination sensor system 47 may be implemented in various ways. It may for instance comprise two separate sensors, one of which measures the first orientation Nx about the first sensor axis x and the other of which measures the second orientation Ny about the second sensor axis y. The two modes of operation for measuring the orientation about the first sensor axis x and the second sensor axis y with respect to the gravitational direction may, however, also be combined in one single inclination sensor outputting measurement values to controller 29 for both orientations Nx and Ny.

As will be explained below, it is possible to determine the alignment of the first axis of rotation 21 with respect to the gravitational direction from the measurement values for the first orientation Nx about the first sensor axis x taken at different rotational positions of the second device component 17 with respect to the first device component 13 about the first axis of rotation 21. From the measurement values for the first orientation Nx and the second orientation Ny taken at different rotational positions of the second device component 17 with respect to the first device component 13 about the first axis of rotation 21 and optionally at different rotational positions of the third device component 15 with respect to the second device component 17 about the second axis of rotation 24, it is further possible, as also explained below, to determine an angle γ between the first axis of rotation 21 and the second axis of rotation 24.

First of all, however, the general characteristics of an inclination sensor will be explained referencing FIG. 2.

Figure 2:
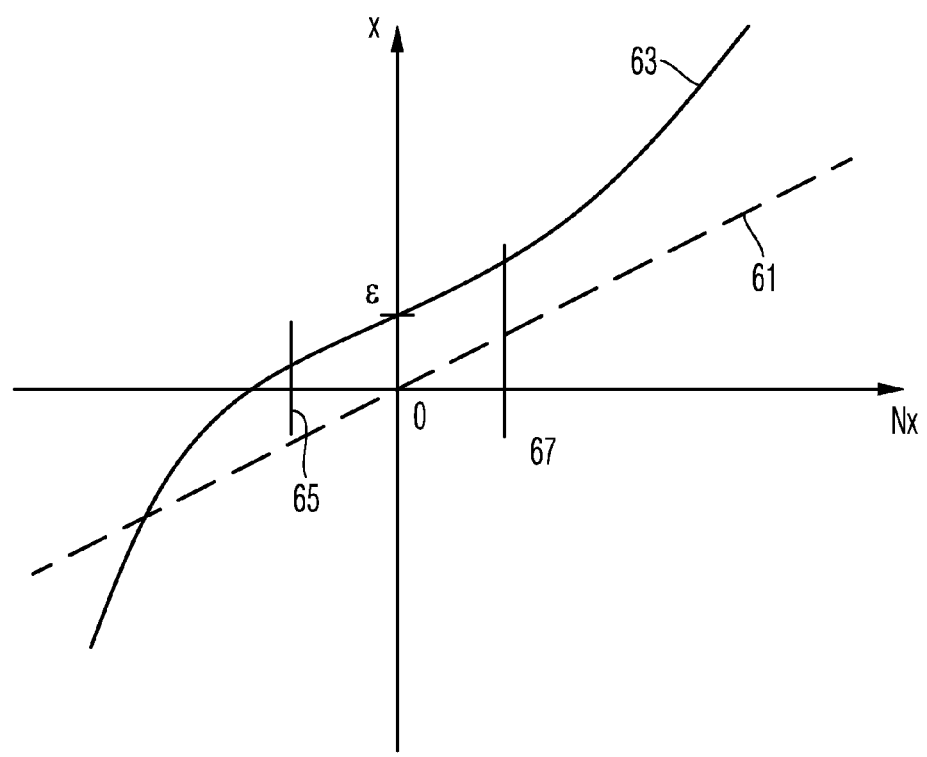
FIG. 2 shows a diagram of measurement values from an inclination sensor system versus the system's orientation.

FIG. 2 shows graphs illustrating characteristics of an inclination sensor system in a schematic and simplified manner. Nx indicates the orientation of the inclination sensor system about a sensor axis x with respect to the gravitational direction, and X indicates the measurement value output from the inclination sensor system. A dashed line 61 represents the ideal relation between the orientation Nx and the measurement values output from the inclination sensor system dependent on the orientation. According to this ideal relation, the measurement values X are exactly proportional to the orientation Nx.

In FIG. 2, a line 63 illustrates an exemplary relation between orientation Nx and measurement value X as it may occur in practice. In practice, the measurement values X are not exactly proportional to the orientation Nx. In practice, a horizontal orientation (Nx=0) does not result in a measurement value of 0 but in an output of an offset ε. The functional dependency of line 63 is furthermore only linear in a portion of the possible orientations and shows outside of this portion significant deviations from linearity. The portion in which the measurement values X depend approximately linearly on the orientation Nx, is located in FIG. 2 between the values 65 and 67 for the orientation. In practice, the values 65 and 67 are typically at Nx=+/−1°, and the value of ε may be a multiple of the measurement accuracy of the inclination sensor system.

In the following, a method for determining the orientation I of the first axis of rotation 21 with respect to the gravitational direction, and the angle γ between the first axis of rotation 21 and the second axis of rotation 24 will be explained referencing FIG. 3.

In a first step 101, the second device component 17 is moved into a starting position relative to the first device component 13 about the first axis of rotation 21. Then, the third device component 25 is rotated in step 103 relative to the second device component 17 until the inclination sensor system 47 is oriented with respect to the gravitational direction such that it is within the measurement range for the first orientation Nx and the second orientation Ny and outputs measurements values. With respect to the first orientation Nx, this is reliably possible by only rotating the third device component 25 with respect to the second device component 17. With respect to the second orientation Ny being in parallel with the second axis of rotation 24, this will not be the case in some rotational positions of the second device component 17 relative to the first device component 13, when the first axis of rotation 21 is inclined too much with respect to the gravitational direction. In that case, it has to be returned to step 101 in order to find a different starting position of the second device component 17 relative to the first device component 13 such that the inclination sensor system 47 is in a subsequent step 103 also for the second orientation Ny within the measurement range. A respective starting position can be determined after some iterations and alternating implementation of steps 101 and 103 or simultaneous implementation of steps 101 and 103. The respective rotational position of the second device component 17 relative to the first device component 13 is assumed in the following as a starting position of 0°.

Next, the measurement values of the angle sensor 31 are read out by the controller in step 105 in order to determine an angle value α1 of the rotational position of the second device component 17 with respect to the first device component 13 about the first axis of rotation 21, measurement values of the second angle sensor 33 are read in order to determine an angle value β1 of the rotational position of the third device component 15 with respect to the second device component 17 about the second axis of rotation 24, measurement values of the inclination sensor system 47 are read in order to determine an angle value X1 of the first orientation Nx of the inclination sensor system 47 about the first sensor axis x, and measurement values of the inclination sensor system 47 are read in order to determine an angle value Y1 of the second orientation Ny of the inclination sensor system 47 about the second sensor axis y.

Thereafter, the second device component 17 is rotated in step 111 by 90° relative to the first device component 13 about the first axis of rotation 21. If required, the controller rotates the third device component 25 with respect to the second device component 17 until the inclination sensor system 47 is within the measurement range for the first orientation Nx. Then, the controller 29 reads in step 115 again measurement values from sensors 31, 33, and 47 in order to determine an angle value α2 for the rotational position between the first and the second device component, an angle value β2 for the rotational position between the second and the third device component, and an angle value X2 of the first orientation Nx of the inclination sensor system 47.

Next, the third device component 17 is rotated in step 121 by further 90° with respect to the first device component 13 into the 180°-position. At this point, the third device component 25 will, if required, again be rotated in step 123 with respect to the second device component 17 until the inclination sensor system is again within the measurement range for the first orientation Nx and the second orientation. The measurement values of sensors 31, 33, and 47 are then read again by controller 29 in step 125 in order to determine an angle value α3 for the rotational position between the first and the second device component, an angle value β3 for the rotational position of the second and the third device component, an angle value X3 for the first orientation Nx of the inclination sensor system 47, and an angle value Y3 of the second orientation Ny of the inclination sensor system 47.

Next, the second device component 17 is rotated in step 131 relative to the first device component 13 by further 90° into a 270°-position. At this point, the controller will, if required, rotate the third device component 25 in step 133 with respect to the second device component 17 until the inclination sensor system is within the measurement range for the first orientation Nx. The measurement values of sensors 31, 33, and 47 are then read in step 135 in order to determine an angle value α4 for the rotational position between the first and the second device component, an angle value β4 for the rotational position of the second and the third device component, an angle value X4 for the first orientation Nx of the inclination sensor system 47.

In step 141, a pair of values is determined for each of the rotational positions 0°, 90°, 180°, and 270°, which first value is the value α between the first and the second device component, and which second value is the sum of angle β between the second and the third device component and the first orientation X. The predefined function $A \cdot \sin(\alpha + \delta) + \epsilon$ is fitted to the pairs of values by adjusting parameters A, δ, and ε according to the least square principle. The orientation I of the first axis of rotation 21 relative to the gravitational direction can thus be determined from parameters A, δ, and ε for any desired rotational position α.

In step 151, the angle γ between the first axis of rotation 21 and the second axis of rotation 24 is determined according to the following equation:

$$\gamma = 90° + [(\beta 2 + X2) + (\beta 4 + X4)]/2 - [Y1 + Y3]/2$$

With the inclination I of the first axis of rotation 21 with respect to the gravitational direction thus determined, and the angle γ between the first axis of rotation 21 and the second axis of rotation 24 thus determined, and further the measured rotational positions of the second device component 17 relative to the first device component 13 and the rotational positions of the third device component 25 relative to the second device component 17, it is possible to determine the spatial orientation of the optics' 43 measurement axis 42.

Figure 3:
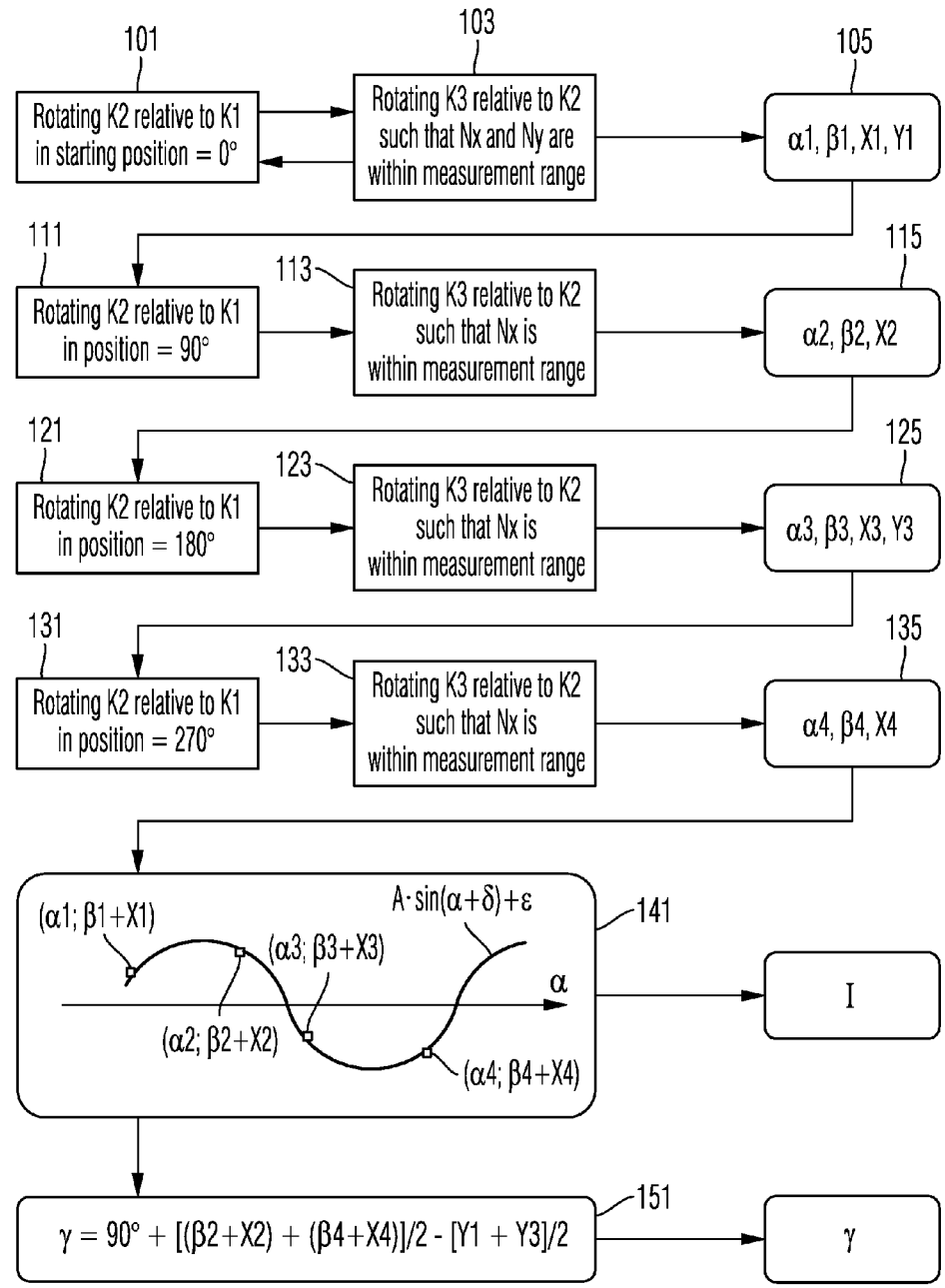
FIG. 3 shows a flow chart illustrating a method for determining a characteristic of the device shown in FIG. 1.

The device explained referencing FIG. 1 and the method explained referencing FIG. 3 may be modified in various ways:

The measurement values Y of the second orientation Ny are not determined in steps 115 and 135, because they are not needed in steps 141 and 151. It is, however, possible to determine these values also in steps 115 and 135 and to include them into a subsequent calculation in steps 141 and 151 for increasing the accuracy. The axis-crossing error of the inclination sensor system 47 may hereby for instance be determined and compensated.

It is further possible to either omit the determination of the orientation of the first axis of rotation 21 with respect to the gravitational direction or the determination of the angle γ between the first and the second axis of rotation. If the determination of the angle γ between the first and the second axis of rotation is omitted, there is no need to determine the measurement values of the second orientation of the inclination sensor system about the second sensor axis y in steps 105 and 125. In this case it is also not necessary that the inclination sensor system 47 is adapted for a measurement of the second orientation.

In the example of FIG. 1, the sensor axis x is aligned in parallel with the second axis of rotation 24. Exceptions are permissible, as long as the first sensor axis is not aligned orthogonally to the second axis of rotation. The second sensor axis y of the inclination sensor system is in the example of FIG. 1 further aligned orthogonally to the first sensor axis x of the inclination sensor system. Exceptions are also permissible in this case, as long as the second sensor axis y is not aligned in parallel with the first sensor axis x. The second sensor axis y of the inclination sensor system is in the representation of FIG. 1 further aligned orthogonally to the measurement axis 42 of the optics 43. This results in the third device component 25 having in most situations to be rotated out of the position shown in FIG. 1 by about 90° about the second axis of rotation 24, in order to align the inclination sensor system 47 substantially horizontally and to place it thus within the measurement range for the first and second orientations. A respective rotation of the third device component 25 requires time. The necessary time may be reduced by arranging the inclination sensor system 47 within the third device component such that the second sensor axis y of the inclination sensor system is substantially aligned in parallel with the measurement axis 42 of optics 43.

In the method explained with respect to FIG. 3, four different rotational positions of the second device component relative to the first device component are used, with the rotational positions differing from each other by 90°. Exceptions are permissible by using for example only two or three or more than four rotational positions. Further, the angles between the different rotational positions my have values different from 90°. Furthermore it is possible to measure the measurement value for the rotational position of 90° required in step 141 for fitting the function to the measurement values already in the starting position 0°, by reading the measurement value Y of the second orientation Ny of the inclination sensor system about the second sensor axis y in the starting position 0°. This is possible, provided that the inclination sensor system is adapted such that its first and its second sensor axes are aligned orthogonally with each other. It is thus possible to obtain the measurement value X2 without being required to additionally set the rotational position to 90°. Similarly, it is possible to obtain the measurement value X4 already in the rotational position of 180° without being required to additionally set the rotational position to 270°.

In step 141, the second values of the pairs of values are each calculated from the sum of the angle value β between the first and the second device component and the angle value X of the first orientation Nx of the inclination sensor system about the first sensor axis x. It is, however, possible to use only angle value β between the second device component and the third device component as the second value of the pair of values, when the third device component is rotated in steps 103, 113, 123, and 133 relative to the second device component such that the measurement value X of the first orientation Nx corresponds to the angle value of 0°.

The invention has been explained in the context of FIGS. 1 to 3 with respect to a geodetic device. The invention is, however, not limited to a geodetic device and may be used with other devices having three device components being rotatable with respect to each other and having the respective inclination sensors.

The invention claimed is:

1. A method for determining a characteristic of a device, in particular of a geodetic device, the device comprising:
   a controller;
   a first device component;
   a second device component being rotatable with respect to the first device component about a first axis of rotation;
   a third device component being rotatable with respect to the second device component about a second axis of rotation aligned transversely to the first axis of rotation;
   a first angle sensor to determine a rotational position of the second device component with respect to the first device component;
   a second angle sensor to determine a rotational position of the third device component with respect to the second device component; and
   an inclination sensor system adapted to determine a first orientation of the inclination sensor system about a first sensor axis with respect to the gravitational direction, the inclination sensor system being mounted on the third device component such that the first sensor axis is not aligned orthogonally to the second axis of rotation;
   wherein the method comprises:
   orienting the second device component with respect to the first device component in a plurality of different rotational positions, whereby in each rotational position of the plurality of rotational positions:
      a measurement value of the first angle sensor is determined;
      a measurement value of the second angle sensor is determined; and
      a measurement value of the first orientation of the inclination sensor system is determined; and
   determining an alignment of at least one of the first device component, the first axis of rotation with respect to the gravitational direction, and the first axis of rotation with respect to the second axis of rotation based on the measurement values.

2. The method according to claim 1, wherein an angle between the first axis of rotation and the second axis of rotation is substantially 90°.

3. The method according to claim 1, wherein an angle between the second axis of rotation and the first sensor axis is substantially 0°.

4. The method according to claim 1, wherein the device comprises a first motor for rotating the second device component with respect to the first device component about the first axis of rotation, and wherein the first motor is operated by the controller for aligning the second device component with respect to the first device component successively in the plurality of rotational positions.

5. The method according to claim 1, wherein for each rotational position of the plurality of rotational positions:
   a first angle value is determined based on the measurement value from the second angle sensor,
   a second angle value is determined based on the measurement value for the first orientation of the inclination sensor system.

6. The method according to claim 5, wherein the device comprises a second motor for rotating the third device component with respect to the second device component about the second axis of rotation, and
   wherein the second motor is operated by the controller in each rotational position of the plurality of rotational positions for aligning the third device component with respect to the second device component such that the second angle value becomes zero.

7. The method according to claim 6, wherein for each rotational position of the plurality of rotational positions:
   a third angle value is determined based on the measurement value from the first angle sensor, and
   a pair of values is formed, the first value of which is the third angle value and the second value of which is the first angle value, and
   wherein the method further comprises:
   determining parameters of a predefined function such that displacements between the pairs of values and the function are minimized,
   wherein the alignment of the first device component is determined relative to the gravitational direction based on the parameters determined.

8. The method according to claim 7, wherein the function is a sine function, and wherein the parameters comprise an amplitude and a phase of the sine function.

9. The method according to claim 5, wherein for each rotational position of the plurality of rotational positions:
   a third angle value is determined based on the measurement value from the first angle sensor,
   a fourth angle value is determined based on a sum of the first angle value and the second angle value, and
   a pair of values is formed, the first value of which is the third angle value and the second value of which is the fourth angle value, and
   wherein the method further comprises:
   determining parameters of a predefined function such that displacements between the pairs of values and the function are minimized,
   wherein the alignment of the first device component is determined relative to the gravitational direction based on the parameters.

10. The method according to claim 9, wherein the inclination sensor system has a limited measurement range for the first orientation and is adapted to measure the first orientation with a specified preciseness only for a portion of the possible orientations of the inclination sensor system about the first sensor axis relative to the gravitational direction, and
    wherein the third device component is in each rotational position of the plurality of rotational positions further oriented with respect to the second device component such that the first orientation of the inclination sensor system is located within said portion.

11. The method according to claim 10, wherein the device comprises a second motor for rotating the third device component with respect to the second device component about the second axis of rotation, and
    wherein the second motor is operated by the controller for aligning the third device component with respect to the second device component such that the first orientation of the inclination sensor system is located within said portion.

12. The method according to claim 1, wherein the inclination sensor system is further adapted to determine a second orientation of the inclination sensor system about a second sensor axis relative to the gravitational direction, the second sensor axis being aligned transverse to the first sensor axis;
    wherein a measurement value for the second orientation of the inclination sensor system is determined in at least two rotational positions of the plurality of rotational positions; and
    wherein the alignment of the first axis of rotation with respect to the second axis of rotation is determined from the measurement values.

13. The method according to claim 12, wherein an angle between the first sensor axis and the second sensor axis is substantially 90°.

14. The method according to claim 12, wherein a rotational position of the third device component relative to the second device component in a first rotational position of the plurality of rotational positions of the second device component relative to the first device component is different to a rotational position of the third device component relative to the second device component in a second rotational position of the plurality of rotational positions of the second device component relative to the first device component.

15. A geodetic device comprising:
    a first device component;
    a second device component being rotatable with respect to the first device component about a first axis of rotation;
    a third device component being rotatable with respect to the second device component about a second axis of rotation aligned transversely to the first axis of rotation, the third device component comprising a measurement axis;
    a first angle sensor to determine a rotational position of the second device component with respect to the first device component;
    a second angle sensor to determine a rotational position of the third device component with respect to the second device component;
    an inclination sensor system adapted to determine a first orientation of the inclination sensor system about a first sensor axis with respect to the gravitational direction, the inclination sensor system being mounted on the third device component such that the first sensor axis is not aligned orthogonally to the second axis of rotation; and
    a controller adapted to determine at least one of an alignment of the first device component relative to the gravitational direction, an alignment of the first axis of rotation with respect to the second axis of rotation, and a characteristic of the inclination sensor system from the measurement values of the inclination sensor system.

16. The geodetic device according to claim 15, wherein a measurement accuracy of the inclination sensor system is better than 5", and in particular better than 2".

17. The geodetic device according to claim 15, wherein the inclination sensor system is further adapted to determine a second orientation of the inclination sensor system about a second sensor axis relative to the gravitational direction, the second sensor axis being aligned transverse to the first sensor axis.

18. The geodetic device according to claim 15, wherein the controller is adapted to:
    orient the second device component with respect to the first device component in a plurality of different rotational positions, whereby in each rotational position of the plurality of rotational positions:
        a measurement value of the first angle sensor is determined;
        a measurement value of the second angle sensor is determined; and
        a measurement value of the first orientation of the inclination sensor system is determined; and
    determine an alignment of at least one of the first device component, the first axis of rotation with respect to the gravitational direction, and the first axis of rotation with respect to the second axis of rotation based on the measurement values.

\* \* \* \* \*